United States Patent [19]

Edwards

[11] E Re. 29,089

[45] Reissued Dec. 28, 1976

[54] PNEUMATIC TIRES

[75] Inventor: Reginald H. Edwards, Sutton Coldfield, England

[73] Assignee: Dunlop Limited, London, England

[22] Filed: Feb. 23, 1976

[21] Appl. No.: 660,630

Related U.S. Patent Documents

Reissue of:

[64] Patent No.: 3,841,375
Issued: Oct. 15, 1974
Appl. No.: 279,239
Filed: Aug. 9, 1972

[30] Foreign Application Priority Data

Aug. 21, 1971 United Kingdom ..... 39343/71

[52] U.S. Cl. ..... 152/355; 152/330 RF; 152/353 R; 152/357 R; 152/374

[51] Int. Cl.[2] ..... B60C 9/04; B60C 5/00

[58] Field of Search ..... 152/354, 355, 353, 357 R, 152/330 RF, 374

[56] References Cited

UNITED STATES PATENTS

| | | | |
|---|---|---|---|
| 1,445,540 | 2/1923 | Mullikin | 152/187 |
| 2,721,185 | 10/1955 | Schulze et al. | 152/357 |
| 3,172,445 | 3/1965 | Boussu et al. | 152/354 |
| 3,192,984 | 7/1965 | Bourdon | 152/354 |
| 3,207,200 | 9/1965 | Boussu et al. | 152/354 |
| 3,394,751 | 7/1968 | Sidles et al. | 152/352 |
| 3,464,477 | 9/1969 | Verdier | 152/353 |
| 3,542,108 | 11/1970 | Rye et al. | 152/354 |
| 3,599,695 | 8/1971 | Knight | 152/352 |
| 3,610,310 | 10/1971 | Wittneben | 152/352 |

*Primary Examiner*—Drayton E. Hoffman
*Attorney, Agent, or Firm*—Stevens, Davis, Miller & Mosher

[57] ABSTRACT

A radial ply tire comprises a tread, sidewall and bead regions. At least the region of severe flexing of the sidewall when the tire is run in a deflated or substantially under-inflated condition comprises a rubber compound which has a rebound resilience of at least 87 percent, and more preferably of at least 90 percent, measured by the [Lupke] *Dunlop* pendulum method according to B.S. 903/1950 and a hardness in the range of 45–65 Shore A.

15 Claims, 3 Drawing Figures

PNEUMATIC TIRES

Matter enclosed in heavy brackets [ ] appears in the original patent but forms no part of this reissue specification; matter printed in italics indicates the additions made by reissue.

This invention relates to pneumatic tires.

According to the present invention a radial ply pneumatic tire comprises a tread, sidewalls and beads, at least the region of severe flexing of the sidewall when the tire is run in a deflated or substantially underinflated condition comprising a rubber compound having a rebound resilience of at least 87 percent measured by the [Lupke] *Dunlop* pendulum method according to B.S. 903/1950. It is more preferable for the compound to have a rebound resilience of at least 90 percent.

The region of severe flexing in the sidewall when the tire runs flat depends to some extent on the reinforcements in the tire and the relaive thickness of the various parts of the sidewalls. In a radial ply tire however, it is generally a region extending outwardly from below the point of maximum width of the tire to the base of the tire shoulder, and between one-half and three-fourths of the total length of the sidewall.

Preferably the high resilience compound comprises the whole of the rubber in the sidewall including the inner liner but excepting the topping compound on any reinforcing plies in the sidewall. This topping compound may be a high resilience compound also but owing to the very thin layer of rubber involved this is not essential, the hardness of the high resilience compound in the sidewall may be low e.g., 45°–55° Shore A, since high resilience compounds of this order of hardness are easier to obtain. However, it is preferable that the compound be as hard as is possible while still maintaining the desired degree of resilience. Preferably, therefore, the hardness of the compound is of the order of 55 to 65 Shore A.

The harder compound provides a slightly stiffer sidewall which increases slightly the radius of the fold in the sidewall (see FIG. 1 of the drawings) when the tire is deflated. This in turn reduces the flexing and heat generation during deflated running.

Similarly, if desired, one or both shoulders of the tire may be provided with a cushion of the high resilience rubber inside the tire carcass to thicken the tire in this region and further reduce flexing.

Alternatively a buttress may be provided on the outside of the upper sidewall for this purpose, as described in copending U.S. Pat. application No. 150,564 of June 7, 1971.

Compounds currently used in the sidewalls of radial-ply pneumatic tires generally have a resilience of the order of 70 percent and are chosen largely for maximum resistance to sidewall cracking.

It is also usual for the edge of the tread rubber, which is generally harder than the rubber in the sidewall, to be tapered down the tire shoulder terminating at the base of the shoulder. In the tire of this invention, this is highly undesirable since a change of hardness of the rubber at this point concentrates stress during the severe flexing arising in run-flat conditions. In tires of this invention therefore, the high resilience sidewall compound preferably extends into the tire shoulder up to the base of the tread pattern wearable rubber or alternatively, if the high resilience compound is terminated below the latter height, another rubber of similar hardness to the high resilience compound is used between the high resilience rubber and the base of the tread pattern wearable rubber. The high resilience compound may for example be based on natural rubber compounds.

Preferably the high resilience compound extends in the sidewall between the base of the wearable tread pattern rubber and the sidewall immediately radially outward of the rim flange. An example of a suitable compound formulation of a highly resilient rubber is detailed below in Table I.

TABLE I

| | |
|---|---|
| Natural Rubber | 100.00 |
| Sulphur | 2.75 |
| C.B.S. | 1.00 |
| Stearic Acid | 1.00 |
| I.P.P.D. | 2.00 |
| Paraffin Wax | 1.00 |
| Aromatic Oil | 3.00 |
| Zinc Oxide | 10.00 |
| G.P.F. Black | 17.50 |
| | 138.25 |

The resilience of this compound was measured to be 95 percent and hardness 51 Shore A.

An example of a harder compound having resilience of 90 percent and 61 Shore A hardness is given below in Table II.

TABLE II

| | Parts by wt. |
|---|---|
| Natural Rubber SMR10 | 100.00 |
| Sulphur | 3.10 |
| M.B.S. (Accelerator) | 1.10 |
| Stearic Acid | 1.00 |
| Aromatic Oil | 4.00 |
| Paraffin Wax | 1.00 |
| Antioxidant (I.P.P.D.) | 2.50 |
| ZnO | 15.00 |
| G.P.F. Black | 44.00 |
| | 171.70 |

The radial ply tire of this invention may have a steel or textile radial ply carcass together with any suitable breaker construction and material. The aspect ratio of the tire i.e. the ratio of the tire section height to the tires section depth is preferably in the range 30 to 75 percent and particularly between 55 and 70 percent. The tire is particularly suitable for use in a tire and wheel assembly in which the wheel rim on which the tire is mounted has a width between flanges less than the width of the tread of the tire, and provision is made to ensure that the beads can not be displaced from their seats and fall into a well in the rim. The ground contacting surface of the tread of the tire is preferably substantially flat.

The tire and wheel assembly is preferably provided with a liquid lubricant as described in U.S. Pat. No. 3,739,829. The tire may be coated internally with a lubricant as described in U.S. Pat. application No. 150,558 of June 7, 1971. However, a liquid lubricant is preferably enclosed in the tire and wheel assembly in enclosing means which will release the lubricant into the tire when the tire becomes deflated or substantially underinflated as described in U.S. Pat. application No. 150,627 of June 7, 1971.

It has been found that when the tire of the present invention is run in a substantially under-inflated or flat condition the provision of the high resilience rubber compound in the sidewalls reduces the considerable heat which otherwise builds up in the sidewall of the tire eventually leading to cracking and failure of the tire in the region of severe flexing.

The invention will now be described in more detail with reference to the accompanying drawings in which.

Figure 1:
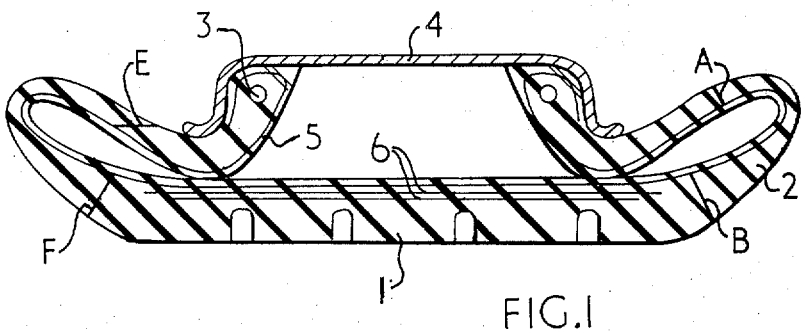
FIG. 1 shows, in section, a tire having a high resilience compound in its sidewall, deflated and under load.

The tire consists of a tread 1, sidewalls and beads 3 and as shown in the drawings, is mounted on a wheel rim 4 (shown schematically) which has a width between flanges less than the width of the tread 1 of the tire. The tire also includes a carcass 5 of radial cords turned up around the beads 3 and a pair of breaker plies 6 extending beneath substantially the full width of the tread.

As shown on one sidewall of the flattened tire in FIG. 1, the zone of severe flexing of the sidewall 2 is the region of the sidewall between the lines A and B. On the other sidewall of the tire of FIG. 1 the lines E and F show the position of the high resilience rubber in the tire illustrated.

Figure 2:
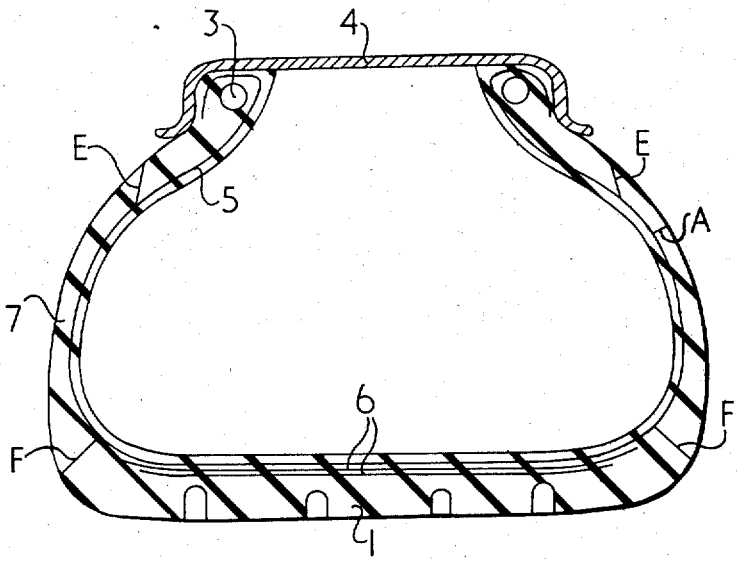
FIG. 2 shows, in section, the same tire in the inflated condition.

As shown more clearly in FIG. 2 the tire contains a rubber of resilience at least 90 percent in the region 7 of the sidewall between the line E and the line F so that the high resilience rubber extends from a point close to but radially outwardly of the rim flange to the base of the tread pattern wearable rubber.

Tests have been carried out to investigate the effect on temperature build-up in the tire sidewall produced by varying the resilience of the sidewall compound.

Textile radial ply tires (size 185/60 × 13) in which the rubber in the sidewall region between E and F (see FIG. 2) and in the inner liner of the tire was of various levels of hardness and resilience. The temperature generated in the tire sidewall was measured on three different tires run at the same speed and conditions with the tire totally flat and mounted on a 3½ inches wide crimped rim. The results are tabulated below:

| Resilience of S/W cpd | Hardness of S/W cpd | Temp. |
|---|---|---|
| 70% | 61 Shore A | 120° C |
| 90% | 61 Shore A | 90° C |
| 95% | 51 Shore A | 95° C |

Similar tests were carried out to compare a compound of 90 percent resilience and 60/61 Shore A hardness with a similar compound of 87 percent resilience and similar hardness. These tires were the same size as the tires mentioned above, but were run (in the same position on the same car) at an inflation pressure of 4 psi. The results were as follows:

| S/W cpd. resilience | S/W cpd Hardness | Temp. (50 mls. at 4 psi) |
|---|---|---|
| 90% | 61 Shore A | 87° C |

-continued

| S/W cpd. resilience | S/W cpd Hardness | Temp. (50 mls. at 4 psi) |
|---|---|---|
| 87% | 60 Shore A | 108° C |

From this test it appears that for compounds of this hardness level (which give better results than softer compounds) the resilience value is extremely critical in the region of 90 percent a small difference in resilience producing a markedly different result. The compound of 87 percent resilience was adequate if some inflation pressure is present and modest performance standards are set, but was inferior to the higher resilience compound.

In all the tests mentioned above the temperature measurement was carried out by inserting a suitable thermocouple into the mid-sidewall region of the tire sidewall i.e., the position of maximum width of the tire.

Figure 3:
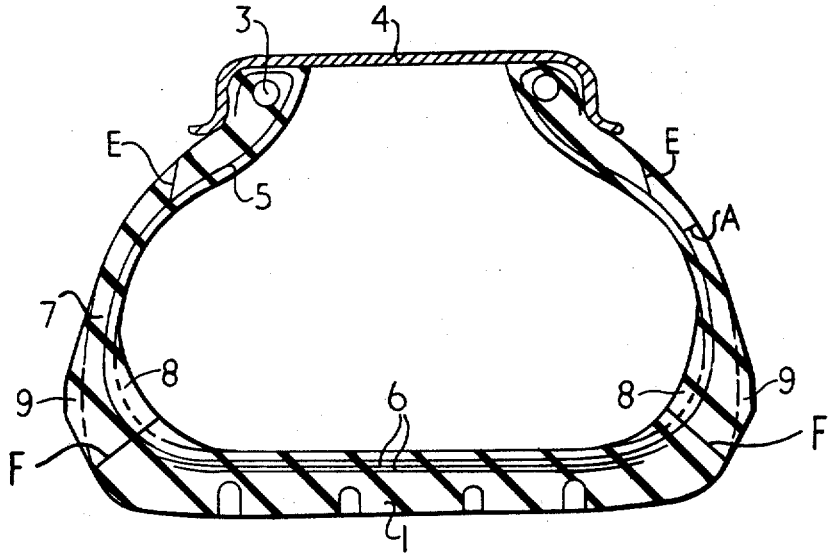
FIG. 3 is a sectional view of a tire similar to that of FIG. 2 having a cushion of high resilience compound inside the tire carcass and an external buttress of high resilience compound on the shoulders.

In the tire of FIG. 3 a cushion 8 of high resilience compound is provided inside the tire carcass to thicken the tire in the shoulder region and further reduce flexing. Numeral 9 refers to alternative buttresses as previously discussed.

Having now described my invention, what I claim is:

1. A radial ply pneumatic tire comprising a tread, a pair of sidewalls each terminating in a tire bead and a carcass of substantially radial cords extending from one tire bead to the other, each sidewall having a highly resilient region disposed axially inwardly and axially outwardly of the carcass and extending radially outwardly from a point radially inward of the maximum width of the tire to the radially outer extremity of the sidewall, the highly resilient region being formed of a high resilient rubber compound having a rebound resilience of at least 87 percent measured by the [ Lupke ] *Dunlop* pendulum method according to British Standard 903/1950 and a hardness in the range of 45–65 Shore A.

2. A radial ply pneumatic tire according to claim 1 in which the rubber compound has a rebound resilience of at least 90 percent measured by the [ Lupke ] *Dunlop* pendulum method according to British Standard 903/1950.

3. A radial ply tire according to claim 1 in which the radial cords are provided with a rubber topping compound and the remainder of the rubber in the sidewall consists of the high resilient compound.

4. The tire of claim 1 in which the point from which the high resilient region extends radially outwardly is between one-half and three-quarters of the total length of the sidewall.

5. A radial ply tire according to claim 1 in which the hardness of the high resilient compound is in the range 55–65 Shore A.

6. A radial ply tire according to claim 1 in which the high resilient rubber compound extends into the tires shoulder up to the tread pattern wearable rubber.

7. A radial ply tire according to claim 1 in which the high resilience compound is based on natural rubber.

8. A radial ply tire according to claim 6 in which the high resilience compound extends in the sidewall between the base of the wearable tread pattern rubber and the sidewall immediately radially outward of the rim flange.

9. A radial ply tire according to claim 1 in which the aspect ratio of the tire is in the range 30 to 75 percent.

10. A radial ply tire according to claim 9 in which the aspect ratio is between 55 and 70 percent.

11. A radial ply tire according to claim 1 having a ground contacting surface which is substantially flat.

12. A radial ply tire according to claim 1 in which at least one of the shoulders of the tire is provided with a cushion of high resilience compound inside the tire carcass to thicken the tire in this region.

13. A radial ply tire according to claim 1 having an external buttress of high resilience compound on one or both shoulders of the tire to thicken the tire in this region.

14. In a pneumatic radial tire and wheel assembly capable of being run in a deflated condition having a wheel rim with a pair of opposed annular flanges and means to prevent the tire from becoming dislodged from the wheel when run in a deflated condition; the tire having a pair of sidewalls each terminating in a tire bead and a carcass of substantially radial cords extending from one bead to the other, the improvement comprising means to permit sidewall flexing with low temperature build-up while operating in deflated or low inflation condition, said means comprising two layers of highly resilient material in each sidewall, one layer being disposed axially inwardly and the other being disposed axially outwardly of the carcass, said layers extending radially outwardly from a point radially inward of the maximum axial width of the tire to the radially outer extremity of the sidewall, the layers being formed of a high resilient rubber compound having a rebound resilience of at least 87 percent measured by the [Lupke] *Dunlop* pendulum method according to British Standard 903/1950 and a hardness in the range of 45–65 Shore A.

15. A radial ply pneumatic tire comprising a tread, a pair of sidewalls each terminating in a tire bead with the tread width being greater than the distance between the beads when mounted on a rim and a carcass of substantially radial cords extending from one tire bead to the other, each sidewall having a highly resilient region disposed axially inwardly and axially outwardly of the carcass and extending radially outwardly from a point radially inward of the maximum width of the tire to the radially outer extremity of the sidewall, the highly resilient region being formed of a high resilient rubber compound having a rebound resilience of at least 87 percent measured by the [Lupke] *Dunlop* pendulum method according to British Standard 903/1950 and a hardness in the range of 45–65 Shore A.

* * * * *